(12) United States Patent
Yamaguchi

(10) Patent No.: US 8,331,631 B2
(45) Date of Patent: Dec. 11, 2012

(54) METHOD, APPARATUS, AND PROGRAM FOR DISCRIMINATING THE STATES OF SUBJECTS

(75) Inventor: Yoshitaka Yamaguchi, Kanagawa-ken (JP)

(73) Assignee: Fujifilm Corporation (JP)

( * ) Notice: Subject to any disclaimer, the term of this patent is extended or adjusted under 35 U.S.C. 154(b) by 1346 days.

(21) Appl. No.: 11/703,139

(22) Filed: Feb. 7, 2007

(65) Prior Publication Data

US 2008/0031525 A1    Feb. 7, 2008

(30) Foreign Application Priority Data

Feb. 8, 2006    (JP) .................... 2006-030579

(51) Int. Cl.
*G06K 9/00*    (2006.01)
(52) U.S. Cl. ...................... 382/118; 382/216
(58) Field of Classification Search .......... 382/216, 382/118
See application file for complete search history.

(56) References Cited

U.S. PATENT DOCUMENTS

| | | | |
|---|---|---|---|
| 6,671,391 B1 * | 12/2003 | Zhang et al. ............... | 382/118 |
| 7,502,493 B2 | 3/2009 | Ishida | |
| 2009/0123037 A1 | 5/2009 | Ishida | |

FOREIGN PATENT DOCUMENTS

| | | |
|---|---|---|
| JP | 2004-062565 A | 2/2004 |
| JP | 2004-133637 A | 4/2004 |
| JP | 2004-259215 A | 9/2004 |
| WO | 02/07095 A1 | 1/2002 |
| WO | 02/007095 A1 | 9/2003 |

OTHER PUBLICATIONS

Verma et al "Face detection and tracking in a video by propagating detection probabilities", IEEE-PAMI, 2003.*
Lao et al., "Fast Omni-Directional Face Detection," OMRON Corporation, Meeting on Image Recognition and Understanding, Jul. 2004, pp. 271-276.
Japanese Office Action "Notice of Grounds for Rejection" dated Nov. 2, 2010; Japanese Patent Application No. 2006-030579 with English translation.
Japanese Office Action "Decision of Rejection" dated Feb. 22, 2011; Japanese Patent Application No. 2006-030579; with partial translation.

* cited by examiner

*Primary Examiner* — Matthew Bella
*Assistant Examiner* — Ruiping Li
(74) *Attorney, Agent, or Firm* — Studebaker & Brackett PC; Donald R. Studebaker

(57) ABSTRACT

A single image is obtained from among a plurality of temporal series images. At least one of a plurality of types of classifiers, each type of classifier judging each of a plurality of predetermined states of a predetermined subject, is employed to discriminate the state of the subject within the obtained image. At least one state is predicted for the subject within the obtained image, based on stepwise changes of the state of the subject obtained by previously discriminated states within temporal series images preceding the obtained image. The classifier corresponding to the predicted state is prioritized or weighted, when applying the classifiers to perform discrimination.

12 Claims, 17 Drawing Sheets

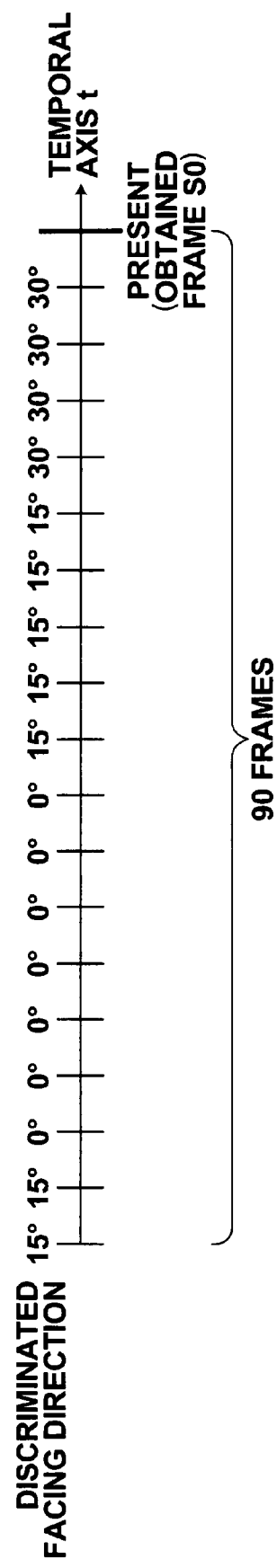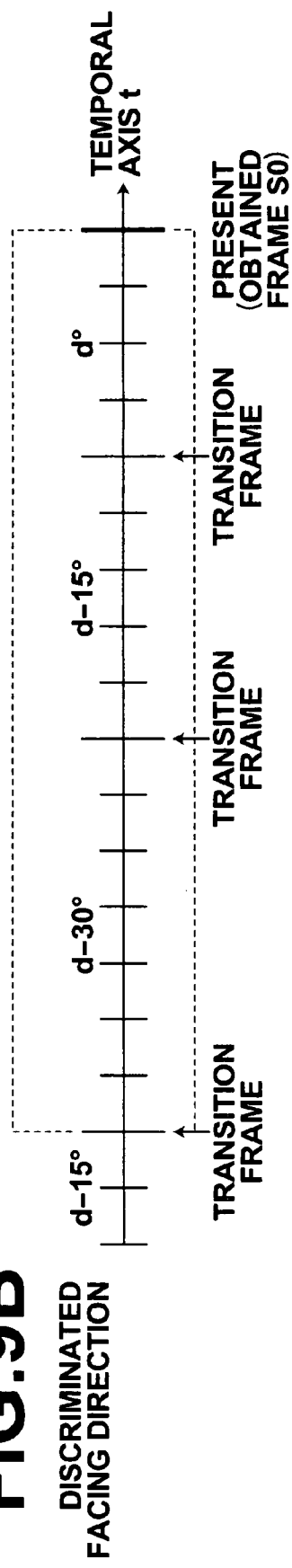

FIG.10

| | PATTERN OF CHANGE IN FACING DIRECTION | PREDICTED FACING DIRECTIONS | CLASSIFIERS TO BE APPLIED | CLASSIFIERS TO BE PRIORITIZED |
|---|---|---|---|---|
| (1) | d° NO CHANGE | d°, d±15° | d°, d±15° | - - - - - |
| (2) | d° → d−15° → d° | d°, d+15° | d°, d±15° | d°, d+15° |
| | d° → d+15° → d° | d°, d−15° | d°, d±15° | d°, d−15° |
| (2') | d−15° → d° | d°, d+15° | d°, d±15° | d°, d+15° |
| | d+15° → d° | d−15°, d° | d°, d±15° | d−15°, d° |
| (3-1) | d−30° → −15° → d° <br> d+30° → +15° → d° <br> (CASES IN WHICH S0 IS WITHIN F-f FRAMES FROM n2) | d° | d°, d±15° | d° |
| (3-2) | d−30° → −15° → d° <br> (CASES IN WHICH S0 IS OVER F-f FRAMES AWAY FROM n2) | d+15° | d°, d±15° | d+15° |
| | d+30° → +15° → d° <br> (CASES IN WHICH S0 IS OVER F-f FRAMES AWAY FROM n2) | d−15° | d°, d±15° | d−15° |

F IS THE NUMBER OF FRAMES BETWEEN n1 AND n2 +1, f=F/4

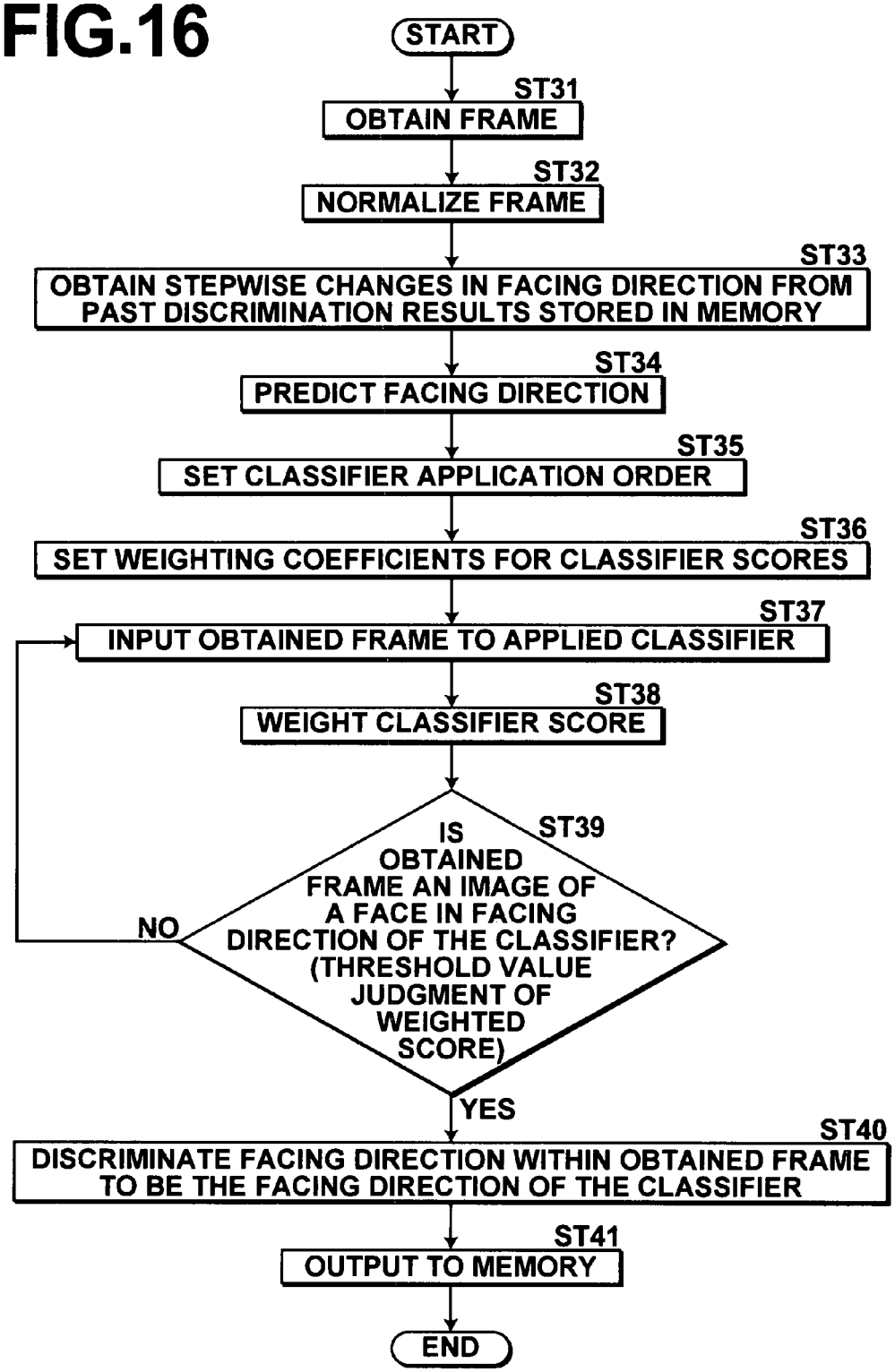

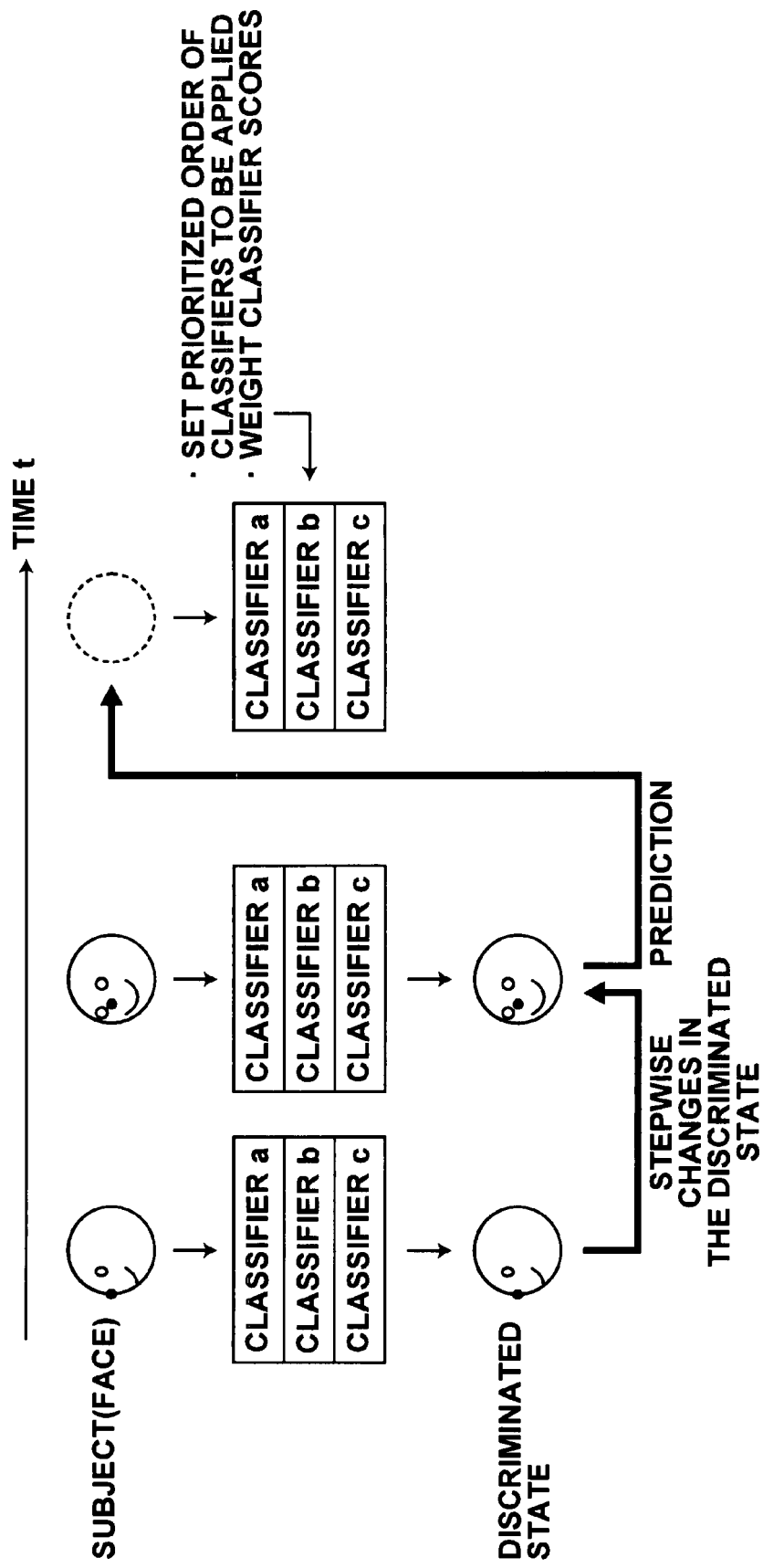

METHOD, APPARATUS, AND PROGRAM FOR DISCRIMINATING THE STATES OF SUBJECTS

BACKGROUND OF THE INVENTION

1. Field of the Invention

The present invention relates to a method, apparatus, and program for discriminating the states of subjects, for example, within frames of digital temporal series images that include the subjects, by employing a plurality of types of state classifiers to classify and discriminate the states thereof.

2. Description of the Related Art

Various methods have been proposed to discriminate the states of subjects within digital images (hereinafter, simply referred to as "images").

For example, Japanese Unexamined Patent Publication No. 2004-259215 discloses a method for discriminating the directions in which faces included in images are facing. In this method, human faces are designated as predetermined subjects, and the directions in which the faces are facing are designated as the states of the subject. Templates are prepared for each direction that the faces face, and the directions in which the faces are facing are discriminated by template matching.

As another example, S. Lao, et al. disclose a method for discriminating the directions in which faces are facing within images, in "Fast Omni-Directional Face Detection", Meeting on Image Recognition and Understanding, July 2004. In this method, human faces are designated as predetermined subjects, and the directions that the faces are facing are designated as the states of the subject. Classifiers for judging whether judgment target images include faces facing in predetermined directions are prepared for each direction that the faces face, and the directions in which the faces are facing are discriminated thereby.

The aforementioned image discriminating methods assume that the states of subjects to be discriminated are discriminated from within still images. Accordingly, in the case that the states of predetermined subjects are to be discriminated from within temporally sequential images, such as a plurality of frames obtained by video imaging, the same process is executed for each image.

However, there are correlations among the states of predetermined subjects within temporally adjacent images. In the aforementioned methods, these correlations are ignored. Therefore, efficiency is poor and discrimination takes time, which is not favorable, particularly during real time processing.

SUMMARY OF THE INVENTION

The present invention has been developed in view of the foregoing circumstances. It is an object of the present invention to provide a method, an apparatus, and a program for efficiently discriminating the state of predetermined subjects within temporal series images.

A first subject state discriminating method of the present invention comprises the steps of:

preparing a plurality of types of state classifiers, for judging whether a judgment target image includes a predetermined subject in predetermined states, each type of state classifier corresponding to each of the predetermined states;

obtaining a single image from among a plurality of temporal series images of the predetermined subject;

applying at least one of the types of state classifiers to the obtained image to judge whether the obtained image includes the predetermined subject; and discriminating that the predetermined subject within the obtained image is in a state corresponding to that of the state classifier that judged that the predetermined subject is included in the obtained image, in the case that any of the state classifiers judges that the predetermined subject is included in the obtained image; wherein:

stepwise changes in the state of the predetermined subject are obtained, based on previously discriminated states of the predetermined subject within a plurality of temporal series images preceding the obtained image;

at least one state of the predetermined subject is predicted for the obtained image, based on the stepwise changes; and the state classifier that corresponds to the at least one predicted state is prioritized over other state classifiers, when applying the state classifiers to the obtained image.

A second subject state discriminating method of the present invention comprises the steps of:

preparing a plurality of types of state classifiers, for judging whether a judgment target image includes a predetermined subject in predetermined states, each type of state classifier corresponding to each of the predetermined states;

obtaining a single image from among a plurality of temporal series images of the predetermined subject;

applying at least one of the types of state classifiers to the obtained image to judge whether the obtained image includes the predetermined subject; and discriminating that the predetermined subject within the obtained image is in a state corresponding to that of the state classifier that judged that the predetermined subject is included in the obtained image, in the case that any of the state classifiers judges that the predetermined subject is included in the obtained image; wherein:

the state classifiers calculate index values that represent probabilities that the judgment target image includes the predetermined subject in the predetermined states, and performs judgments by comparing the index values against threshold values;

stepwise changes in the state of the predetermined subject are obtained, based on previously discriminated states of the predetermined subject within a plurality of temporal series images preceding the obtained image;

at least one state of the predetermined subject is predicted for the obtained image, based on the stepwise changes; and the index value of the state classifier that corresponds to the at least one predicted state is weighted, when applying the state classifiers to the obtained image.

A first subject state discriminating apparatus of the present invention comprises:

a plurality of types of state classifiers, for judging whether a judgment target image includes a predetermined subject in predetermined states, each type of state classifier corresponding to each of the predetermined states;

image obtaining means, for obtaining a single image from among a plurality of temporal series images of the predetermined subject;

state classifier applying means, for applying at least one of the types of state classifiers to the obtained image to judge whether the obtained image includes the predetermined subject;

state discriminating means, for discriminating that the predetermined subject within the obtained image is in a state corresponding to that of the state classifier that judged that the predetermined subject is included in the obtained image, in the case that any of the applied state classifiers judges that the predetermined subject is included in the obtained image;

memory means, for recording previous discrimination results for the plurality of temporal series images;

state predicting means, for obtaining stepwise changes in the state of the predetermined subject, based on previously discriminated states of the predetermined subject within a plurality of temporal series images preceding the obtained image recorded in the memory means, and for predicting at least one state of the predetermined subject for the obtained image, based on the stepwise changes; and state classifier application order setting means, for setting the order that the state classifiers are applied such that the state classifier that corresponds to the at least one predicted state is prioritized over other state classifiers, when applying the state classifiers to the obtained image.

A second subject state discriminating apparatus of the present invention comprises:

a plurality of types of state classifiers, for judging whether a judgment target image includes a predetermined subject in predetermined states, each type of state classifier corresponding to each of the predetermined states;

image obtaining means, for obtaining a single image from among a plurality of temporal series images of the predetermined subject;

state classifier applying means, for applying at least one of the types of state classifiers to the obtained image to judge whether the obtained image includes the predetermined subject, the state classifiers performing judgments by calculating index values that represent probabilities that the judgment target image includes the predetermined subject in the predetermined states and comparing the index values against threshold values;

state discriminating means, for discriminating that the predetermined subject within the obtained image is in a state corresponding to that of the state classifier that judged that the predetermined subject is included in the obtained image, in the case that any of the applied state classifiers judges that the predetermined subject is included in the obtained image;

memory means, for recording previous discrimination results for the plurality of temporal series images;

state predicting means, for obtaining stepwise changes in the state of the predetermined subject, based on previously discriminated states of the predetermined subject within a plurality of temporal series images preceding the obtained image recorded in the memory means, and for predicting at least one state of the predetermined subject for the obtained image, based on the stepwise changes; and index weighting means, for weighting the index value of the state classifier that corresponds to the at least one predicted state, when applying the state classifiers to the obtained image.

A first subject state discriminating program causes a computer to function as:

a plurality of types of state classifiers, for judging whether a judgment target image includes a predetermined subject in predetermined states, each type of state classifier corresponding to each of the predetermined states;

image obtaining means, for obtaining a single image from among a plurality of temporal series images of the predetermined subject;

state classifier applying means, for applying at least one of the types of state classifiers to the obtained image to judge whether the obtained image includes the predetermined subject;

state discriminating means, for discriminating that the predetermined subject within the obtained image is in a state corresponding to that of the state classifier that judged that the predetermined subject is included in the obtained image, in the case that any of the applied state classifiers judges that the predetermined subject is included in the obtained image;

memory means, for recording previous discrimination results for the plurality of temporal series images;

state predicting means, for obtaining stepwise changes in the state of the predetermined subject, based on previously discriminated states of the predetermined subject within a plurality of temporal series images preceding the obtained image recorded in the memory means, and for predicting at least one state of the predetermined subject for the obtained image, based on the stepwise changes; and state classifier application order setting means, for setting the order that the state classifiers are applied such that the state classifier that corresponds to the at least one predicted state is prioritized over other state classifiers, when applying the state classifiers to the obtained image.

A second subject state discriminating program causes a computer to function as:

a plurality of types of state classifiers, for judging whether a judgment target image includes a predetermined subject in predetermined states, each type of state classifier corresponding to each of the predetermined states;

image obtaining means, for obtaining a single image from among a plurality of temporal series images of the predetermined subject;

state classifier applying means, for applying at least one of the types of state classifiers to the obtained image to judge whether the obtained image includes the predetermined subject, the state classifiers performing judgments by calculating index values that represent probabilities that the judgment target image includes the predetermined subject in the predetermined states and comparing the index values against threshold values;

state discriminating means, for discriminating that the predetermined subject within the obtained image is in a state corresponding to that of the state classifier that judged that the predetermined subject is included in the obtained image, in the case that any of the applied state classifiers judges that the predetermined subject is included in the obtained image;

memory means, for recording previous discrimination results for the plurality of temporal series images;

state predicting means, for obtaining stepwise changes in the state of the predetermined subject, based on previously discriminated states of the predetermined subject within a plurality of temporal series images preceding the obtained image recorded in the memory means, and for predicting at least one state of the predetermined subject for the obtained image, based on the stepwise changes; and index weighting means, for weighting the index value of the state classifier that corresponds to the at least one predicted state, when applying the state classifiers to the obtained image.

In the present invention, the predetermined subject may be a face, and the predetermined states may be phases during blinking of eyes, phases during laughter, or directions in which the faces are facing. Alternatively, the predetermined subject may be a person, and the predetermined states may be phases during a hand raising motion, or phases during walking. As a further alternative, the predetermined subject may be a door, and the predetermined states may be phases during opening/closing thereof.

Here, the term "subject" has the same meaning as the term "object" in the field of image processing.

The term "temporal series images" refers to a plurality of images which are arranged along a temporal axis, obtained by video imaging or continuous photography.

The phrase "weighting the index value of the state classifier that corresponds to the at least one predicted state" refers to increasing the index value of the corresponding state classifier relative to index values calculated by other state classifiers, or decreasing a threshold value employed for threshold value judgment for the corresponding state classifier relative to the threshold values of the other state classifiers.

The "directions in which the faces are facing" refers to directions that the faces face in out-of-plane (not within the plan of the image) directions. In other words, the directions are those in the directions that faces face when persons shake their heads from side to side.

The state classifiers may be those which have been generated by learning a plurality of sample images that include the predetermined subject by a machine learning method. The neural network method, the boosting method and the like are examples of the machine learning method. In the present invention, the boosting method is preferred.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

According to the first subject state discriminating method, the first subject state discriminating apparatus, and the first subject state discriminating program of the present invention, a plurality of types of state classifiers, which have been prepared for the predetermined subject for each state thereof and each of which corresponds to each of the predetermined states, are employed. During discrimination of the state of the predetermined subject from within temporal series images, the plurality of types of state classifiers are not repeatedly used in the same order. Instead, past discrimination results of images within the temporal series images are employed to obtain stepwise changes of the predetermined subject. The state of the subject within the image, which is the target of the discrimination process, is predicted based on the stepwise changes, and the state classifier corresponding to the predicted state is prioritized over other state classifiers when applying the state classifiers. Therefore, the state of the subject within the image, which is the target of the discrimination process, can be discriminated at an earlier stage. That is, the state of the predetermined subject included in the temporal series image can be efficiently discriminated.

According to the second subject state discriminating method, the second subject state discriminating apparatus, and the second subject state discriminating program of the present invention, a plurality of types of state classifiers, which have been prepared for the predetermined subject for each state thereof and which judge whether a discrimination target image includes the predetermined target in predetermined states by threshold value judgment of index values, are employed. During discrimination of the state of the predetermined subject from within temporal series images, the plurality of types of state classifiers do not employ the calculated index values as they are. Instead, past discrimination results of images within the temporal series images are employed to obtain stepwise changes of the predetermined subject. The state of the subject within the image, which is the target of the discrimination process, is predicted based on the stepwise changes, and the index value of the state classifier corresponding to the predicted state is weighted. Therefore, the state of the subject within the image, which is the target of the discrimination process, can be discriminated by threshold value judgments that take the probability of correct discrimination into consideration. That is, the state of the predetermined subject included in the temporal series image can be discriminated with high reliability.

BRIEF DESCRIPTION OF THE DRAWINGS

FIGS. 9A and 9B are diagrams that illustrate discrimination results for frames that temporally precede an obtained frame.

FIG. 10 is a table that illustrates the correspondent relationships among past stepwise change patterns in facing directions and predictable present facing directions.

FIG. 16 is a flow chart that illustrates the processes performed by the facing direction discriminating system 1.

FIG. 17 is a diagram that illustrates the concept of the present invention.

DESCRIPTION OF THE PREFERRED EMBODIMENTS

Hereinafter, a preferred embodiment of the present invention will be described with reference to the attached drawings.

Figure 1:
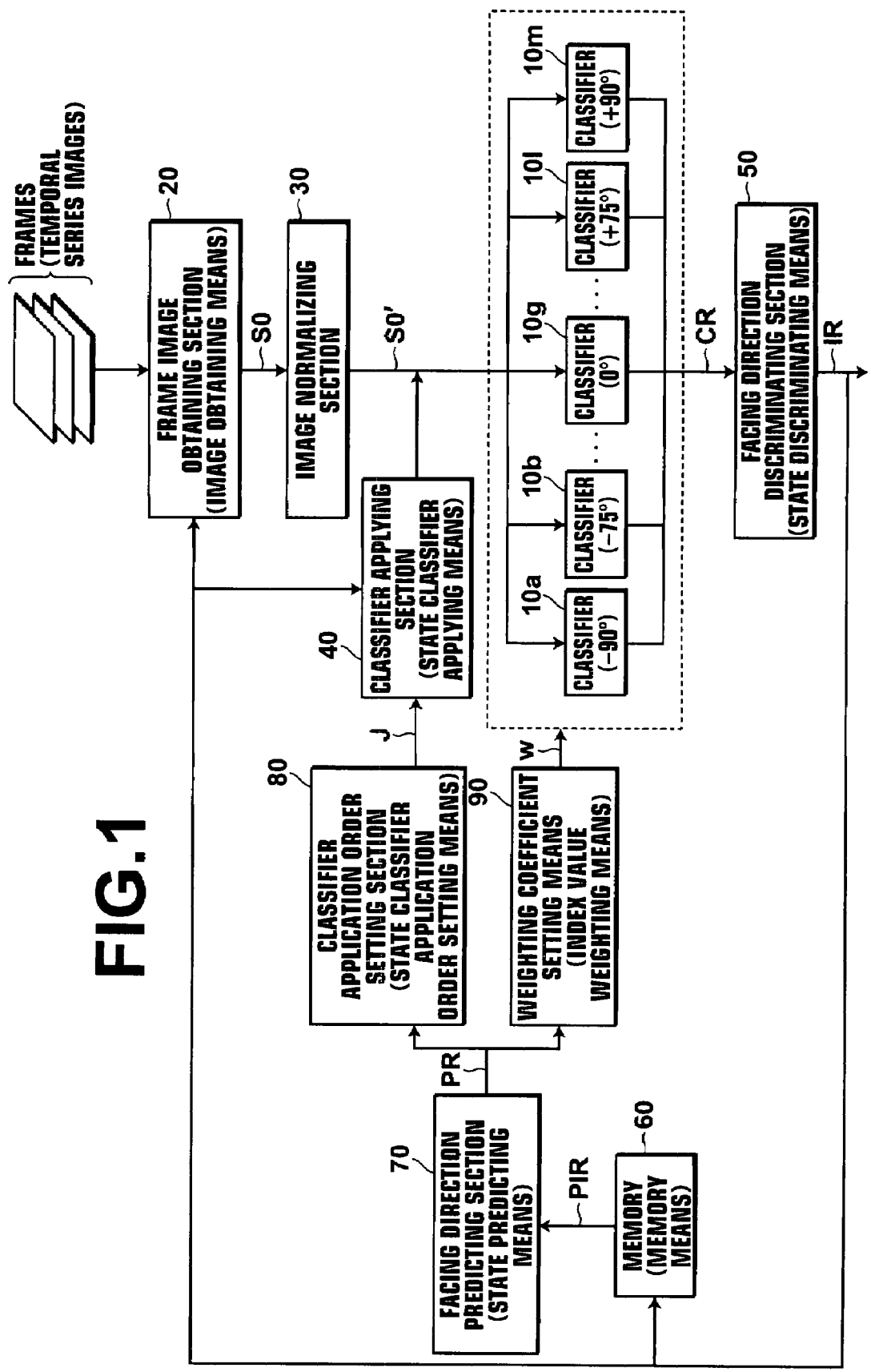
FIG. 1 is a block diagram that illustrates the construction of a facing direction discriminating system 1, which is an embodiment of the present invention.

FIG. 1 is a block diagram that illustrates the construction of a facing direction discriminating system 1, which is an embodiment of the present invention. As illustrated in FIG. 1, the facing direction discriminating system 1 comprises: a plurality of types of classifiers 10a through 10m (state classifiers), for judging whether a judgment target image includes a face facing predetermined direction, for each of the predetermined directions; a frame image obtaining section 20 (image obtaining means), for obtaining a single frame from among a plurality of frames that constitute temporal series images of a face; an image normalizing section 30, for normalizing the obtained frame; a classifier applying section 40 (state classifier applying means), for applying at least one of the plurality of types of classifiers to the obtained frame; a facing direction discriminating section 50 (state discriminating means), for discriminating the direction that the face is facing within the frame, based on the judgment results of the at least one applied classifier; a memory 60 (memory means), for storing past discrimination results for the temporal series images; a facing direction predicting section 70 (state predicting means), for predicting the direction that the face is facing in the obtained frame, based on the past discrimination results; a classifier application order setting section 80 (state classifier application order setting means), for setting the order that the classifiers are applied such that the state classifier that corresponds to the predicted facing direction is prioritized over the other classifiers, when applying the classifiers; and a weighting coefficient setting section 90 (index value weighting means), for setting weighting coefficients of the index values employed for judgment by the classifiers such that the classifier that corresponds to the at least one predicted state is emphasized, when applying the state classifiers to the obtained image. That is, the present facing direction discriminating system 1 sequentially discriminates the directions in which faces are facing within temporal series images by predicting the facing direction based on stepwise changes, that is, past discrimination results, in the case that the direction that the face is facing changes in a stepwise manner, as illustrated in FIG. 17. The prediction results are utilized to improve the efficiency of judgment by the classifiers, and also to improve the reliability of the judgments thereof.

Figure 2:
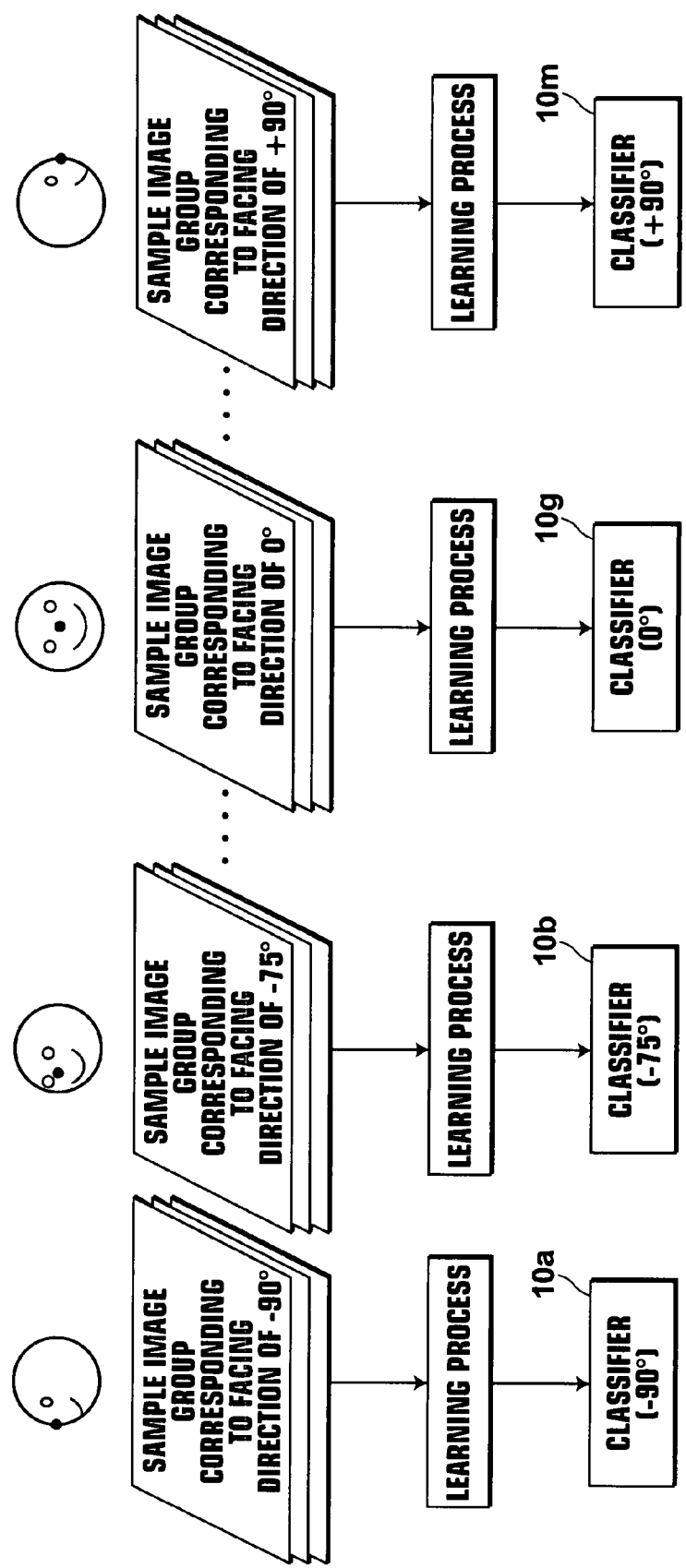
FIG. 2 is a diagram that illustrates the concept behind generating a plurality of classifiers, each of which are capable of judging different facing directions.

The classifiers 10a through 10m are a plurality of types of classifiers that respectively judge whether a judgment target image includes a face facing a predetermined direction. Specifically, the classifiers 10a through 10m are 13 classifiers corresponding to 13 different facing directions of faces, in 15 degree increments from −90 degrees (left profile) to 90 degrees (right profile). The classifiers 10a through 10m learn the characteristics of faces facing the directions that they correspond to by a machine learning method employing sample images, such as boosting, as illustrated in FIG. 2. Each of the classifiers 10a through 10m calculates a unique characteristic amount based on the image pattern of the judgment target image. Scores sc that represent the probability that the judgment target image includes a face corresponding to each of the classifiers are calculated, based on the characteristic amounts. In the case that the score sc is greater than or equal to a predetermined threshold value Th1, it is judged that the judgment target image includes a face facing the predetermined direction.

Here, the construction of each classifier, the processes performed by each classifier, and the learning method of the classifiers will be described.

Each classifier comprises a plurality of weak classifiers WC, which have been selected from a great number of weak classifiers WC by a learning process to be described later, and are effective in judgment. Each of the weak classifiers WC calculate characteristic amounts from the judgment target image W according to a unique predetermined algorithm. Scores scw that represent the probability that the judgment target image W includes faces facing the predetermined direction are calculated, based on the characteristic amounts and individual histograms, to be described later, that function as score tables. The classifier obtains the score sc by totaling the scores scw obtained by the plurality of weak classifiers WC. It is judged that the judgment target image W includes a face facing the predetermined direction when the score sc is greater than or equal to the threshold value Th1.

Figure 3:
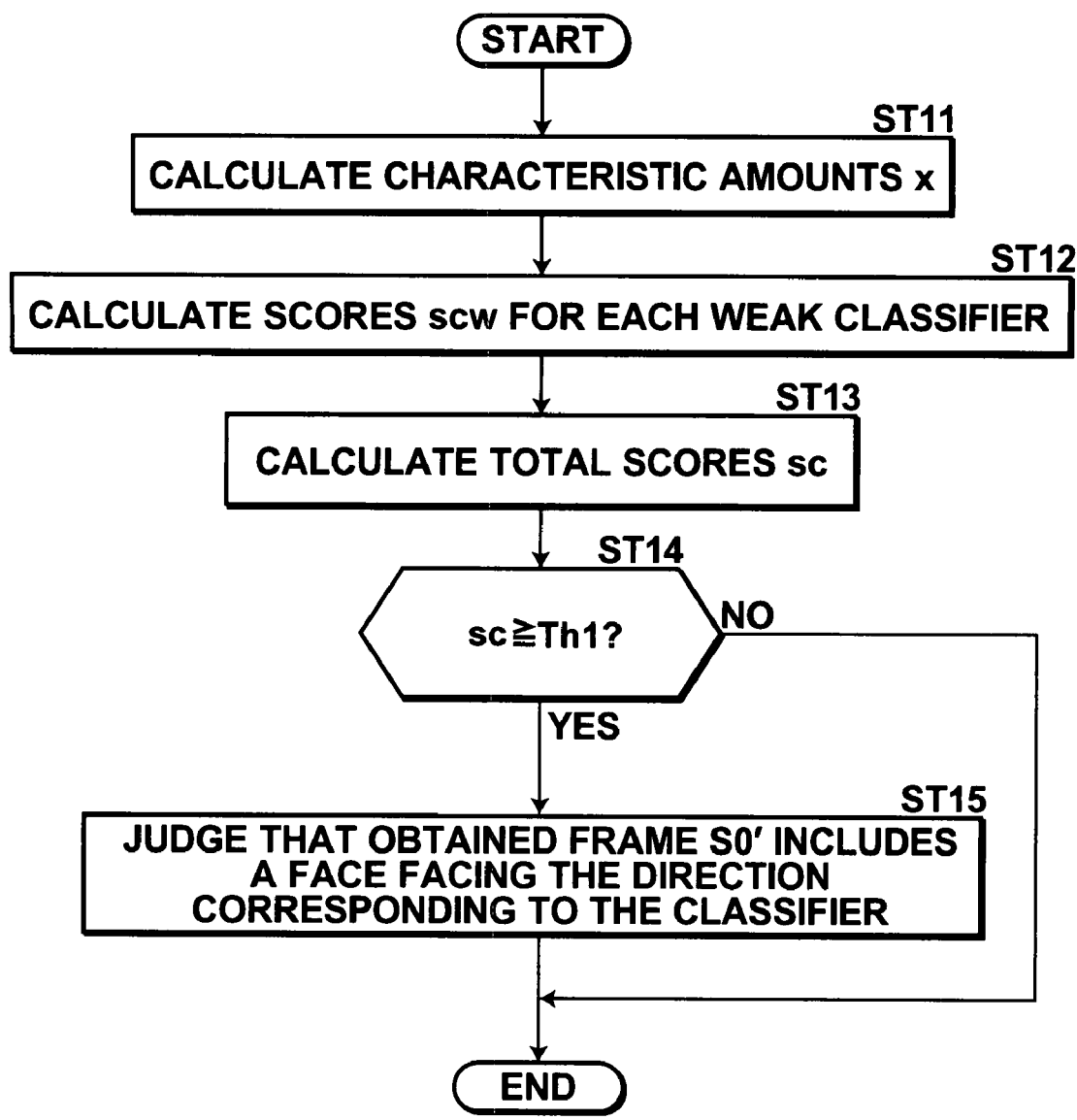
FIG. 3 is a flow chart that illustrates the processes performed by a single classifier.
Figure 4:
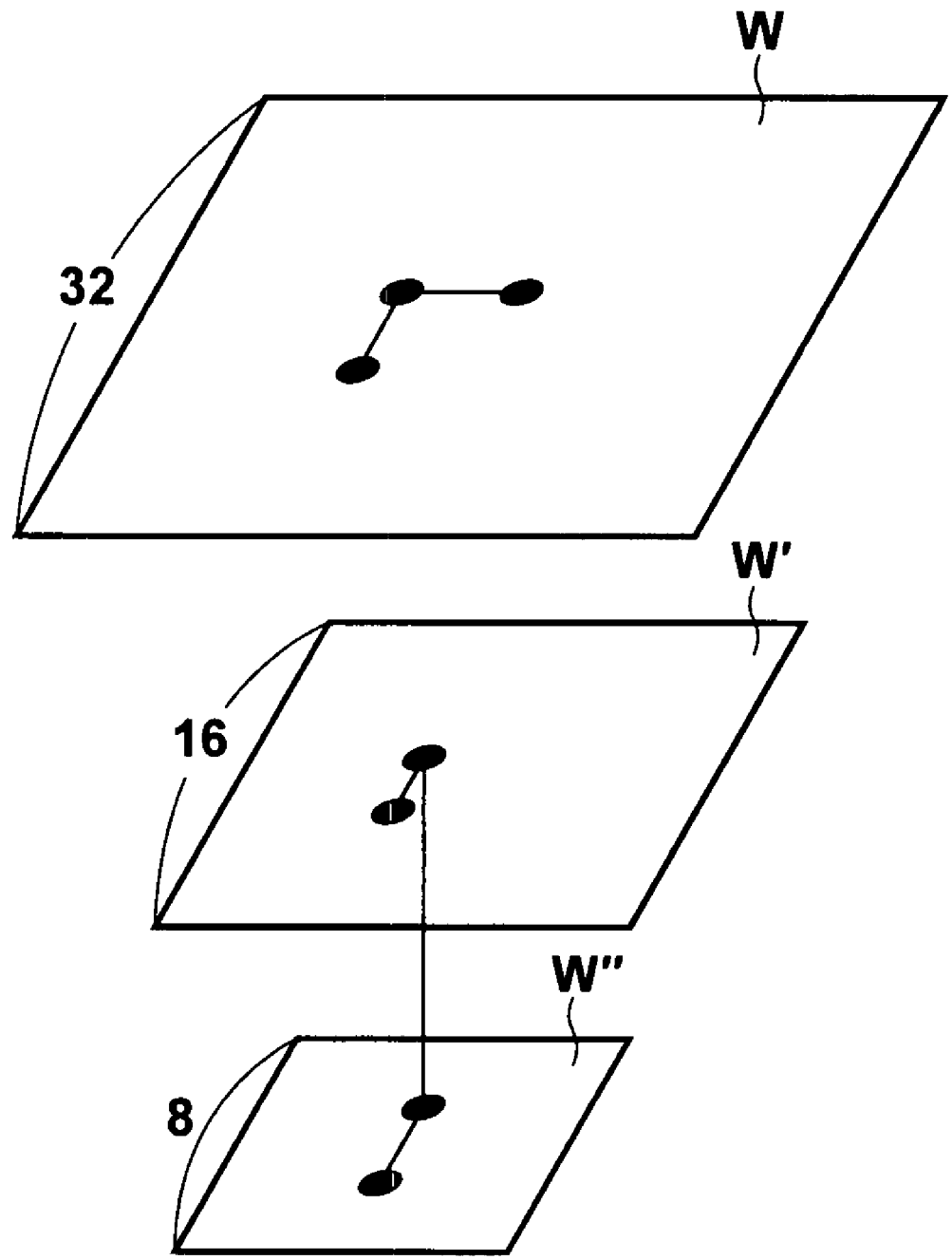
FIG. 4 is a diagram for explaining how a weak classifier calculates characteristic amounts.

FIG. 3 is a flow chart that illustrates the processes performed by a single classifier. When the judgment target image W is input to the classifier, the plurality of weak classifiers WC calculate different types of characteristic amounts x, respectively (step ST11). For example, a 16×16 pixel size image W' and an 8×8 pixel size image W" are obtained as illustrated in FIG. 4, by administering a four neighboring pixel average process on the judgment target image W, which is a 32×32 pixel size image, twice. The four neighboring pixel average process sections the partial image into 2×2 pixel blocks, and assigns the average pixel values of the four pixels within the blocks as the pixel value of pixels that correspond to the blocks. Pairs of points are set within the three images. The differences between the pixel values (brightness values) of points of each pair within a pair group constituted by a plurality of different types of pairs are calculated, and the combinations of the differences are designated to be the characteristic amounts. The two points that constitute each pair may be two predetermined points which are aligned in the vertical direction or the horizontal direction so as to reflect density characteristics of faces within images. A value x corresponding to the combinations of the differences is calculated. Then, a score scw corresponding to the value x that represents the probability that the judgment target image W includes a face to be discriminated by the classifier is calculated for each weak classifier, by referring to a predetermined score table (the individual histogram) (step ST12). For example, in the case of the classifier 10d, the score scw represents the probability that the judgment target image W includes a face facing a direction −45 degrees offset from a forward facing face. The scores scw, which have been calculated for each weak classifier WC, are totaled to obtain a score sc (step ST13). Whether the score sc is greater than or equal to the threshold value Th1 is judged (step ST14). In the case that the result of judgment in step ST14 is affirmative, it is judged that the judgment target image W includes a face facing the predetermined direction corresponding to the classifier (step ST15).

Next, the learning method (generation method) of the classifiers will be described.

Figure 5:
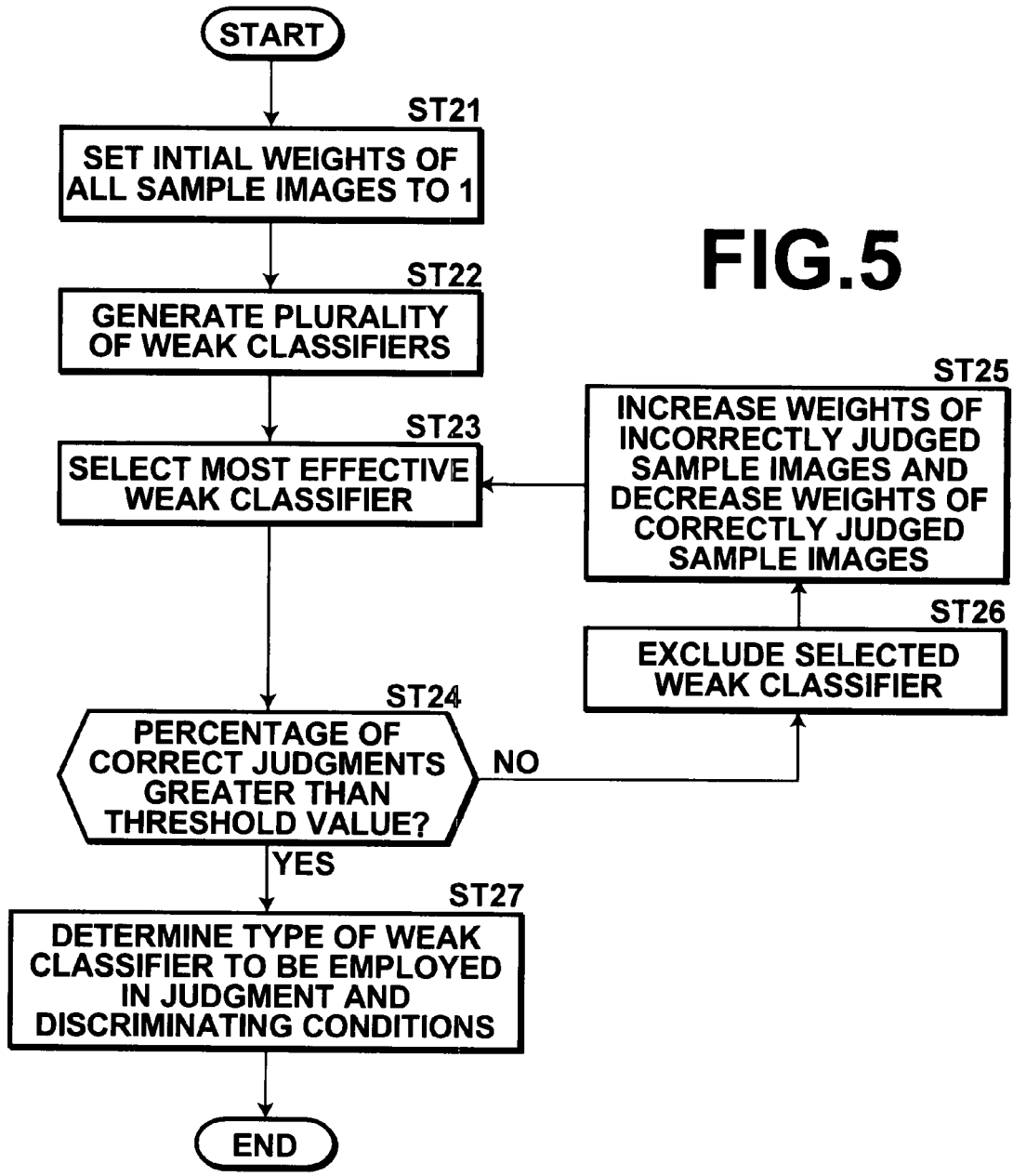
FIG. 5 is a flow chart that illustrates the learning method of a classifier.

FIG. 5 is a flow chart that illustrates the learning method of a classifier. Sample images, which are normalized to a predetermined size, 32×32 pixels, for example, and which have undergone a process similar to a normalizing process administered by the image normalizing means 30 to be described later, are employed in the learning of the classifier. A plurality of different sample images of faces (face sample image group) facing a predetermined direction corresponding to the classifier and a plurality of non face images that do not include faces (non face sample image group) are prepared.

In the face sample image group, variations of each facial sample image are employed. That is, the vertical and/or horizontal dimensions of each sample image are enlarged/reduced at 0.1× increments within a range of 0.7× to 1.2×. in addition, each of the enlarged/reduced sample images is also rotated in three degree increments within a range of ±15 degrees within the planes thereof. Thereby, the classifier can have a degree of tolerance with respect to inclinations of faces and changes in the shapes of faces. That is, faces, which are classifiable by the classifier, can have a certain degree of tolerance with respect to inclinations and changes in the shapes thereof.

Figure 6:
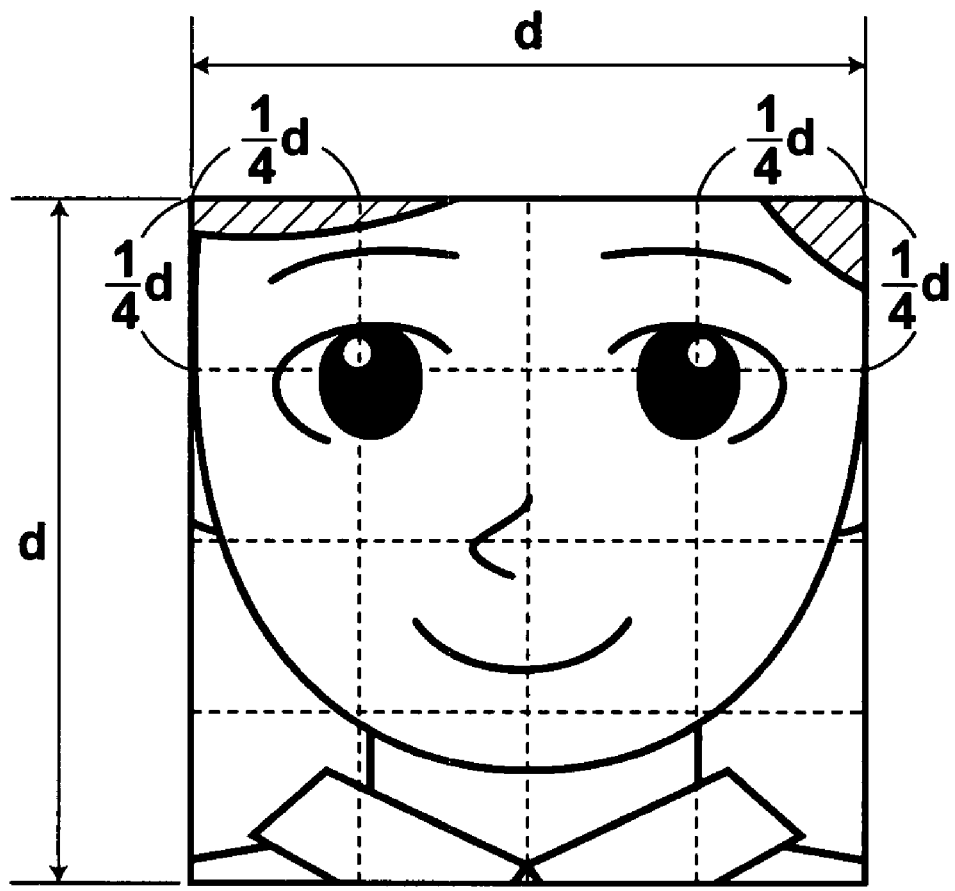
FIG. 6 is a diagram that illustrates a sample image of a face, in which the positions of the eyes are normalized to predetermined positions.

Note that at this time, the sizes and positions of the sample images of faces are standardized such that the eyes therein are at predetermined positions. The enlargement/reduction and rotation are performed with the positions of the eyes as the reference points. For example, in the case of a sample image in which a forward facing face is pictured, the size and the position of the face are standardized such that the positions of the eyes are d/4 down and d/4 toward the interior from the upper left and upper right corners of the image, as illustrated in FIG. 6. The rotation and enlargement/reduction are performed with the center point between the eyes as the center of the image.

Each sample image is weighted, that is, assigned a level of importance. First, the initial values of weighting of all of the sample images are set equally to 1 (step ST21).

Next, weak classifiers are generated for each of a plurality of different pair groups, constituted by pairs of points which are set within the planes of the sample images and the enlarged/reduced sample images (step ST22). Here, each weak classifier has a function of providing a reference to discriminate images of faces from those not of faces, by employing combinations of the differences between pixel values (representing brightness) of each pair of points that constitute the pair group. In the present embodiment, histograms of combinations of the differences between each pair of points that constitutes a single pair group are utilized as the bases for score tables for each weak classifier.

Figure 7:
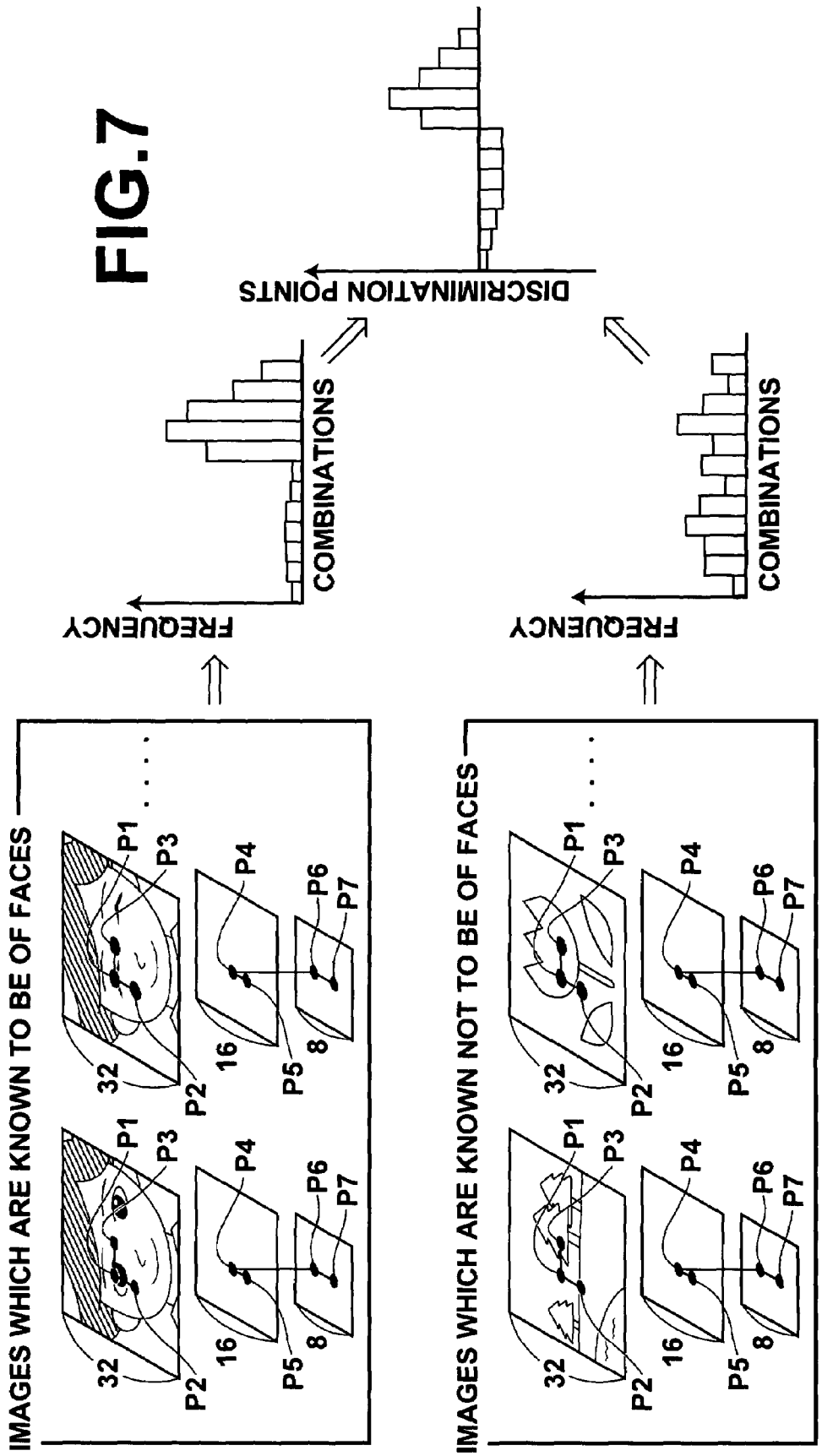
FIG. 7 is a diagram that illustrates a method by which histograms of weak classifiers are generated.

The generation of a weak classifier will be described with reference to FIG. 7. As illustrated in the sample images at the left side of FIG. 7, the pairs of points that constitute the pair group for generating the weak classifier are five pairs, between points P1 and P2, P1 and P3, P4 and P5, P4 and P6, and P6 and P7, within sample images of the face sample image group. The point P1 is located at the center of the right eye, the point P2 is located within the right cheek, and the point P3 is located within the forehead of the sample images. The point P4 is located at the center of the right eye, and the point P5 is located within the right cheek, of a 16×16 pixel size image, obtained by administering the four neighboring pixel average process on the sample image. The point P5 is located at the center of the right eye, and the point P7 is located within the right cheek, of an 8×8 pixel size image, obtained by administering the four neighboring pixel average process on the 16×16 pixel size image. Note that the coordinate positions of the pairs of points that constitute a single pair group for generating a single weak classifier are the same within all of the sample images. Combinations of the differences between the pixel values of each of the five pairs of points that constitute the pair group are calculated for all of the sample images, and a histogram is generated. Here, the values of the combinations of differences between pixel values depend on the number of brightness gradations. In the case that the number of brightness gradations is expressed as 16 bit data, there are 65536 possible differences for each pair of pixel values. Therefore, there are 65536 to the (number of pairs) power, as total possible values of the combinations. In this case, there are $65536^5$ possible values, which would require a great number of samples, a great amount of time, and a great amount of memory to execute learning and detection. Therefore, in the present embodiment, the differences between the pixel values are sectioned at appropriate widths of numerical values, to quantify them into n values (n=100, for example). Thereby, the number of combinations of differences between pixel values becomes $n^5$, and the amount of data that represents the differences between pixel values can be reduced.

In a similar manner, histograms are generated for the plurality of sample images of the non face sample image group. Note that in the sample images of the non face sample image group, points (denoted by the same reference numerals P1 through P7) at positions corresponding to the pixels P1 through P7 of the sample images of the face sample image group are employed in the calculation of the differences between pixel values. Logarithms of the ratios of the frequencies in the two histograms are represented by the rightmost histogram illustrated in FIG. 7, which is employed as the basis for the score table of the weak classifier. The values along the vertical axis of the histogram of the weak classifier will be referred to as discrimination points. According to the weak classifier, images that have distributions of the combinations of differences between pixel values corresponding to positive discrimination points therein are highly likely to be of faces. The likelihood that an image is of a face increases with an increase in the absolute values of the discrimination points. On the other hand, images that have distributions of the combinations of differences between pixel values corresponding to negative discrimination points are highly likely to not be of faces. Again, the likelihood that an image is not of a face increases with an increase in the absolute values of the negative discrimination points. A plurality of weak classifiers are generated in histogram format regarding combinations of the differences between pixel values of pairs of the plurality of types of pair groups in step ST22.

Thereafter, a weak classifier, which is most effective in discriminating whether an image is of a face, is selected from the plurality of weak classifiers generated in step ST22. The selection of the most effective weak classifier is performed while taking the weighting of each sample image into consideration. In this example, the percentages of correct discriminations provided by each of the weak classifiers are compared, and the weak classifier having the highest weighted percentage of correct discriminations is selected (step ST23). At the first step ST23, the weighting of all of the sample images is equal, at 1. Therefore, the weak classifier that correctly discriminates whether sample images are of faces with the highest frequency is selected as the most effective weak classifier. On the other hand, the weighting of each of the sample images is renewed at step ST25, to be described later. Thereafter, the process returns to step ST23. Therefore, at the second step ST23, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step ST23's, more importance is placed on correctly discriminating heavily weighted sample images than lightly weighted sample images.

Next, confirmation is made regarding whether the percentage of correct discriminations of a combination of the weak classifiers which have been selected, that is, weak classifiers that have been utilized in combination (it is not necessary for the weak classifiers to be linked in a linear configuration in the learning stage) exceeds a predetermined threshold value (step ST24). That is, the percentage of discrimination results regarding whether sample images are of faces, which are obtained by the combination of the selected weak classifiers, that match the actual sample images is compared against the predetermined threshold value. Here, the sample images, which are employed in the evaluation of the percentage of correct discriminations, may be those that are weighted with different values, or those that are equally weighted. In the case that the percentage of correct discriminations exceeds the predetermined threshold value, whether an image is of a face can be discriminated by the selected weak classifiers with sufficiently high accuracy, therefore the learning process is completed. In the case that the percentage of correct discriminations is less than or equal to the predetermined threshold value, the process proceeds to step S26, to select an additional weak classifier, to be employed in combination with the weak classifiers which have been selected thus far.

The weak classifier, which has been selected at the immediately preceding step ST23, is excluded from selection in step ST26, so that it is not selected again.

Next, the weighting of sample images, which were not correctly discriminated by the weak classifier selected at the immediately preceding step ST23, is increased, and the weighting of sample images, which were correctly discriminated, is decreased (step ST25). The reason for increasing and decreasing the weighting in this manner is to place more importance on images which were not correctly discriminated by the weak classifiers that have been selected thus far. In this manner, selection of a weak classifier which is capable of correctly discriminating whether these sample images are of a face is encouraged, thereby improving the effect of the combination of weak classifiers.

Thereafter, the process returns to step ST23, and another effective weak classifier is selected, using the weighted percentages of correct discriminations as a reference.

The above steps ST23 through ST26 are repeated to select weak classifiers corresponding to combinations of the differences between pixel values for each pair that constitutes specific pair groups, which are suited for discriminating whether faces are included in images. If the percentages of correct discriminations, which are evaluated at step ST24, exceed the threshold value, the type of weak classifier and discrimination conditions, which are to be employed in discrimination regarding whether images include faces, are determined (step ST27), and the learning process is completed. In addition, a score table, for calculating scores according to combinations of differences between pixel values, is generated for each weak classifier, based on the histograms therefor. Note that the histograms themselves may be employed as the score tables. In this case, the discrimination points of the histograms become the scores.

In this manner, the classifier is generated by learning employing the face sample image group and the non face sample image group. As mentioned previously, in order to generate the plurality different of classifiers for discriminating each of the plurality of facing directions as illustrated in FIG. 2, face sample image groups must be prepared corresponding to each of the facing directions. Then, learning is performed employing each of the face sample groups and the non face sample image group. That is, in the present embodiment, 13 different face sample image groups corresponding to the facing directions of −90°, −75°, −60°, −45°, −30°, −15°, 0°, +15°, +30°, +45°, +60°, +75°, and +90° are prepared. Then, the aforementioned learning is performed employing each of the face sample image groups and the non face sample image group, to generate each of the 13 classifiers 10a through 10m.

Note that in the case that the learning technique described above is applied, the weak classifiers are not limited to those in the histogram format. The weak classifiers may be of any format, as long as they provide references to discriminate between images of faces and other images by employing combinations of the differences between pixel values of each pair that constitutes specific pair groups. Examples of alternative weak classifiers are: binary data, threshold values, functions, and the like. As a further alternative, a histogram that represents the distribution of difference values between the two histograms illustrated in the center of FIG. 11 may be employed, in the case that the weak classifiers are of the histogram format.

The learning technique is not limited to the boosting method which has been described above. Other machine learning techniques, such as a neural network method, may be employed.

The frame image obtaining section 20 sequentially obtains frame images (hereinafter, simply referred to as "frames"), which are temporal series images obtained by video imaging by DSC's and digital movie cameras. Note that in the present embodiment, it is assumed that video imaging is performed at 30 frames/second, and that human faces are imaged such that they are included in the frames at a predetermined position and a predetermined size.

The image normalizing section 30 administers a resolution converting process (size changing process) and a global normalizing process on the frames S0 obtained (hereinafter, referred to as "obtained frames S0") by the frame image obtaining section 20 to obtain normalized obtained frames S0'. The contrast within the normalized obtained frames S0' obtained by the image normalizing section 30 are at a level suitable for judgment processing by the classifiers.

Here, the global normalizing process will be described. The global normalizing process converts the pixel values of the judgment target images W, that is, the obtained frames S0, according to a conversion curve that causes the pixel values of the entirety of the obtained frames S0 to approach values that represent the logarithms of the brightness of the subject therein. The pixel values are converted such that the contrast of the resolution images approach a predetermined level that maximizes the performance of the classifiers.

Figure 8:
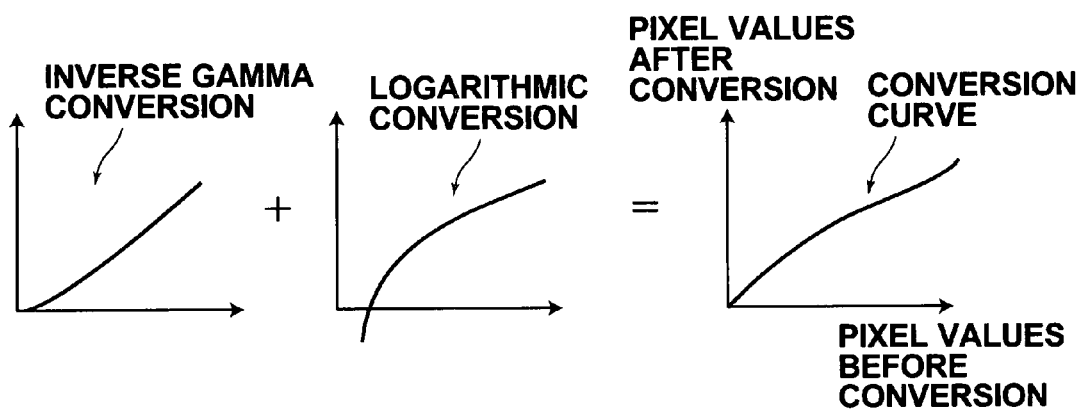
FIG. 8 is a diagram that illustrates an example of a conversion curve which is employed in a global normalizing process.

FIG. 8 illustrates an example of a conversion curve which is employed in the global normalizing process. The global normalizing process may administer inverse gamma conversion (multiply by 2.2) on the pixel values within an sRGB space, then take the logarithms of the pixel values according to the conversion curve (look up table) of FIG. 8. This process is administered for the following reasons.

Optical intensities I, which are observed as an image, is expressed as a product of the reflectance R of a subject and the intensity L of a light source (I=R×L). Accordingly, if the intensity L of the light source changes, the optical intensities I, which are observed as the image, also change. However, if only the reflectance R of the subject is evaluated, then face discrimination that does not depend on the intensity L of the light source, that is, face discrimination, which is not influenced by the brightness of an image, can be performed.

Here, in the case that the intensity of a light source is designated as L, the optical intensity observed at a portion of a subject having a reflectance R1 is designated as I1, and the optical intensity observed at a portion of the subject having a reflectance R2 is designated as I2, the logarithms of each of the values satisfy the following equation:

$$\text{Log}(I1) - \log(I2) = \log(R1 \times L) - \log(R2 \times L) \quad (1)$$
$$= \log(R1) + \log(L) - (\log(R2) + \log(L))$$
$$= \log(R1) - \log(R2)$$
$$= \log(R1/R2)$$

That is, by administering logarithmic conversion on pixel values of an image, the pixel values are converted into a space in which the ratio of reflectances is expressed as differences. In this type of space, it becomes possible to evaluate only the reflectance of a subject, independent of the intensity L of a light source. In other words, contrast, which differs due to brightness within the image, can be matched.

Meanwhile, the color space of images obtained by devices such as digital cameras is generally an sRGB color space. sRGB is an internationally standardized color space, in which colors and chromas are defined, in order to eliminate differences in color reproduction among devices. In this color space, appropriate color reproduction is enabled in image output devices having gamma values (γ out) of 2.2. Therefore, the pixel values of images are multiplied by 1/γ out (=0.45).

Therefore, the pixel values of the pixels within the entirety of the image are converted according to the conversion curve that administers inverse gamma conversion on the pixel values, that is, multiplies the pixel values by 2.2, then takes the logarithms thereof. Thereby, it becomes possible to evaluate only the reflectance of a subject, independent of the intensity of a light source.

Note that this type of global normalizing process can be said to be a process that converts the pixel values of pixels within the entirety of an image according to a conversion curve that converts the pixel values from those of a specific color space to those of a different color space.

By administering such a process on the detection target image, contrast, which differs according to brightness within images, can be matched, and the accuracy of judgment by the classifiers is improved.

The classifier applying section 40 applies at least one of the classifiers 10a through 10m to the obtained frame S0' one at a time in a predetermined order. The classifier applying section 40 judges whether the obtained frame S0' includes a face facing a predetermined direction each time that a classifier is applied thereto. Note that the order in which the classifiers are applied is determined by the classifier application order setting means 80, to be described later.

The facing direction discriminating section 50 discriminates the facing direction of a face within an obtained frame S0' based on classification results CR obtained by a classifier applied thereto. In the case that the applied classifier judges that a face facing the predetermined direction corresponding thereto is not included in the obtained frame S0', the facing direction discriminating section 50 issues a command to the classifier applying section 40 to apply a next classifier. In the case that the applied classifier judges that a face facing the predetermined direction corresponding thereto is included in the obtained frame S0', the face within the obtained frame S0' is discriminated to be facing the direction corresponding to the applied classifier. In the case that the facing direction of the face is discriminated, the discrimination results DR are output to an external device and recorded in the memory 60.

The memory 60 stores various types of data necessary for the facing direction discriminating system 1 to execute various processes. The memory 60 also stores past discrimination results PDR for the temporal series images therein.

The facing direction predicting section 70 obtains stepwise changes in the facing direction of the face, based on previously discriminated facing directions of the face within a plurality of frames preceding the obtained frame S0. The facing direction predicting section 70 predicts at least one facing direction of the face within the obtained frame S0', based on the stepwise changes, and outputs prediction results PR. It is considered that the variation in the facing direction can be sufficiently predicted if discrimination results DR for the immediately preceding few seconds are referred to. Specifically, as illustrated in FIG. 9A, the discrimination results DR of the facing direction are referred to in frames corresponding to a maximum of 3 seconds immediately preceding the obtained frame S0', that is, 90 frames in the case that 30 frames are imaged per second, to obtain stepwise changes of the facing direction. Then, the facing direction in the obtained frame S0' is predicted, based on the obtained stepwise change. That is, the frames are sectioned at points in time at which the facing direction changed within the past 90 frames, as illustrated in FIG. 9B, and the state transition of the facing direction is considered. The prediction of the facing direction is performed, based on the immediately preceding three stepwise changes in the state transition of the facing direction of the facing direction, according to a prediction pattern as illustrated in FIG. 10. Hereinafter, the prediction pattern will be described.

In the present embodiment, it is assumed that the facing direction will not change 30° during a temporal change of a single frame. If the facing direction of the frame immediately preceding the obtained frame S0' is designated as d°, it is considered that the facing direction within the obtained frame S0' will be one of d°, d+15°, and d−15°. In addition, the following patterns can be considered as the stepwise changes in the immediately preceding 90 frames.

1) d°
2) d°, then d−15°, then d°; d°, then d+15°, then d°
2)' d−15', then d°; d+15°, then d°
3) d+30°, then d+15°, then d°; d−30°, then d−15', then d°

The facing direction within the obtained frame S0' is predicted for each of the above variation patterns, based on the following concepts.

Figure 11:
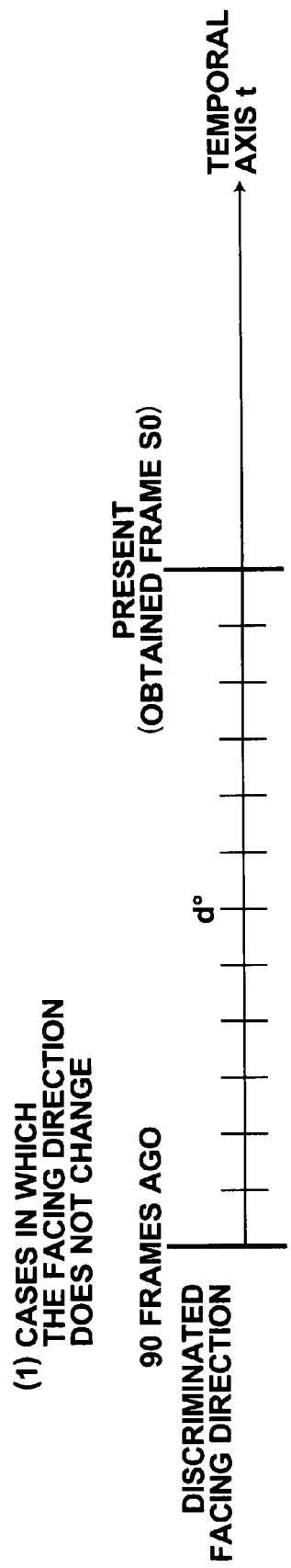
FIG. 11 is a diagram that illustrates past discrimination results for a case in which the facing direction does not change.

(1) Cases in which the Facing Direction Does Not Change:

In the case that the facing direction does not change, as illustrated in FIG. 11, it is unknown how the facing direction will change next. Therefore, the facing direction in the obtained frame S0' is predicted to be one of d°, d−15°, and d+15°.

Figure 12:
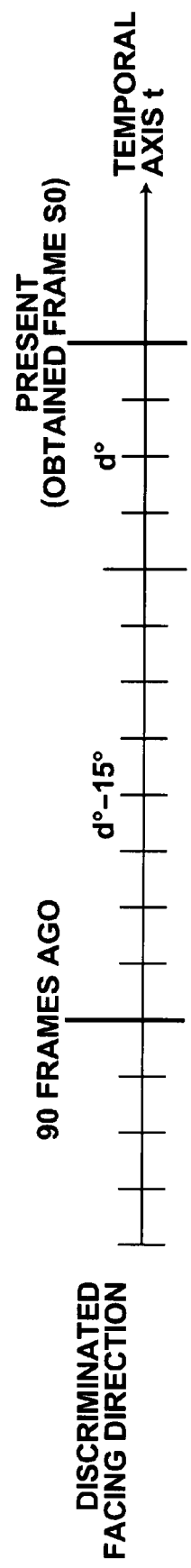
FIG. 12 is a diagram that illustrates past discrimination results for a case in which the facing direction changes one step unidirectionally.

(2) and (2)'Cases in which the Facing Direction Changes One Step Unidirectionally:

In the case that the facing direction changes one step, as illustrated in FIG. 12, it is considered that change will continue in the same direction. That is, the probability that the facing direction will be the same as that of the immediately preceding frame or the next stepwise change in the same direction. Therefore, in the case that the facing direction changes from d° to d−15° and then to d°, the facing direction in the obtained frame S0' is predicted to be either d° or d+151. Similarly, in the case that the facing direction changes from d° to d−15° and then to d°, the facing direction in the obtained frame S0' is predicted to be either d° or d−15°. In the case that the facing direction changes from d−15° to d°, the facing direction in the obtained frame S0' is predicted to be either d° or d+15°. In the case that the facing direction changes from d+15° to d°, the facing direction in the obtained frame S0' is predicted to be either d° or d−15°.

(3) Cases in which the Facing Direction Changes Two Steps Unidirectionally:

The frame at which the first stepwise change occurs is designated as n1, the frame at which the second stepwise change occurs is designated as n2, and the number of frames therebetween +1 is designated as F. If it is assumed that the movement of the facing direction is performed at a constant speed, the frame at which the next change in the facing direction will occur will be the $F^{th}$ frame after frame n2. Therefore, whether the facing direction will undergo a next stepwise change is predicted based on the number of frames between frame n2 and the obtained frame S0'. That is, in the case that the facing direction changes from d−30°, to d−15°, then to d°, the frame at which the facing direction changes from d−30° to d−15° is designated as frame n1, and the frame at which the facing direction changes from d−15° to d° is designated as frame n2. The number of frames between the frames n1 and n2 +1 is designated as F, and prediction is performed based on whether the obtained frame S0' is within F-f frames from frame n2. Here, f is a parameter that satisfies the equation f=F/4. If the movement of the facing direction is performed at a constant speed, the frame at which the next stepwise change occurs will be the $F^{th}$ frame after frame n2. However, because the movement may not be at a perfectly constant speed in actuality, a degree of tolerance is given for the position of the frame at which the next stepwise change is expected to occur.

Figure 13:
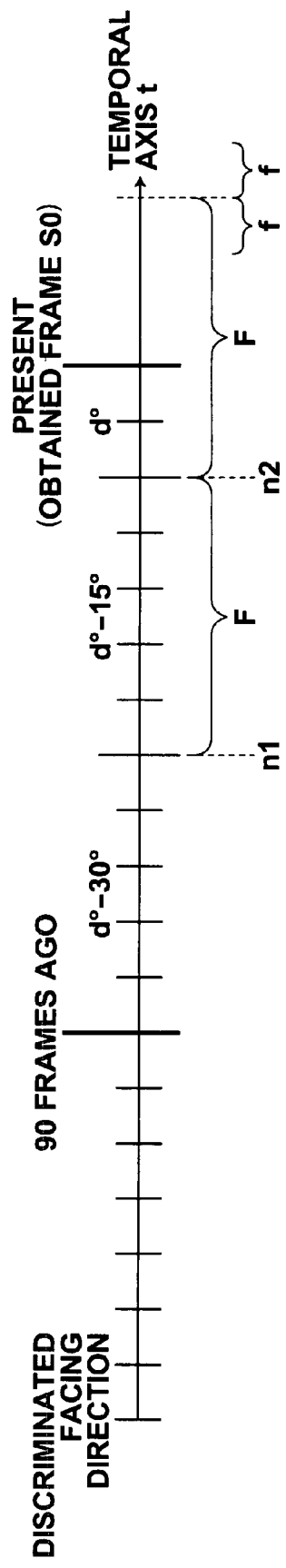
FIG. 13 is a first diagram that illustrates past discrimination results for a case in which the facing direction changes two steps unidirectionally.

(3-1) Cases in which the Obtained Frame S0' is within F-f Frames from Frame n2:

As illustrated in FIG. 13, in the case that the obtained frame S0' is within F-f frames from frame n2, it is considered that the facing direction will not move to the next stepwise change within the obtained frame S0'. In the case that the stepwise change up to this point is d−30°, then d−15°, then d°, the facing direction within the obtained frame S0' is predicted to be d°. Similarly, in the case that the stepwise change up to this point is d+30°, then d+15°, then d°, the facing direction within the obtained frame S0' is predicted to be d°.

Figure 14:
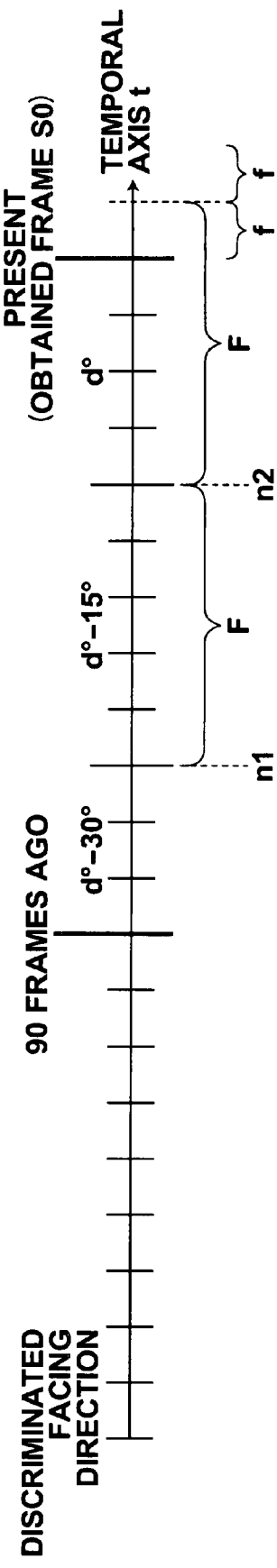
FIG. 14 is a second diagram that illustrates past discrimination results for a case in which the facing direction changes two steps unidirectionally.
Figure 15:
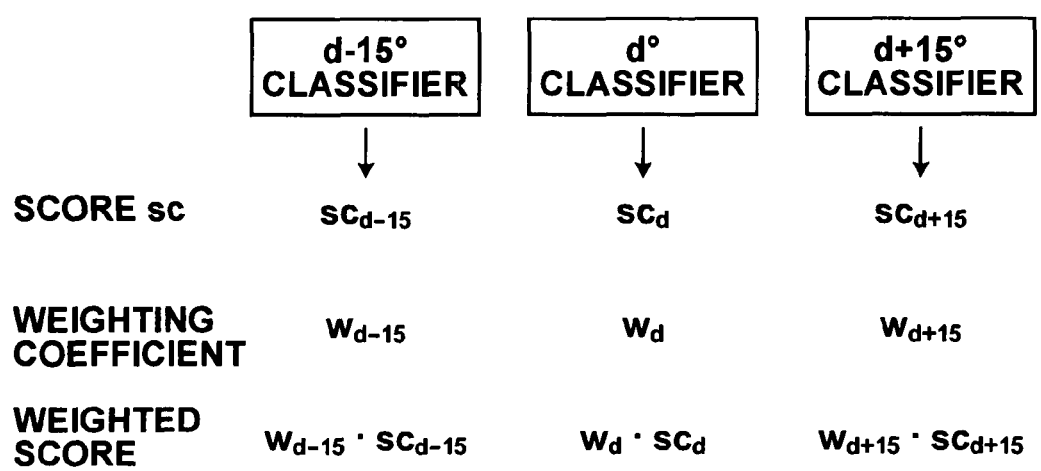
FIG. 15 is a diagram that illustrates the relationships among classifiers and weighting coefficients set therefor.

(3-2) Cases in which the Obtained Frame S0' is Beyond F-f Frames from Frame n2:

As illustrated in FIG. 14, in the case that the obtained frame S0' is beyond F-f frames from frame n2, it is considered that the facing direction will move to the next stepwise change within the obtained frame S0'. In the case that the stepwise change up to this point is d−30°, then d−15°, then d°, the facing direction within the obtained frame S0' is predicted to be d+15°. Similarly, in the case that the stepwise change up to this point is d+30°, then d+15°, then d°, the facing direction within the obtained frame S0' is predicted to be d−15°.

The classifier application order setting section 80 sets an application order J that the classifiers are applied such that the classifier that corresponds to the at least one facing direction predicted by the facing direction predicting section 70 is prioritized over other classifiers, when applying the classifiers to the obtained frame S0'. Here, it is assumed that it is unlikely for the facing direction to change greater than ±15° within the time span of a single frame. Therefore, if the facing direction of the frame immediately preceding the obtained frame S0' is designated as d°, only classifiers corresponding to the facing directions d°, d+15°, and d−15° are applied. Regarding specific rules for setting the application order J, for example, the classifiers to be applied may be grouped into a first group that corresponds to the predicted facing direction, and a second group that includes all of the other classifiers. In the application order J, the classifiers belonging to the first group are prioritized over those belonging to the second group. At the same time, the classifiers are prioritized within each group in a predetermined order, for example, d°, then d−15°, then d+15°.

By prioritizing the application of classifiers corresponding to the predicted facing direction, the probability that the facing direction within the obtained frame S0' will be discriminated at an early stage increases. Therefore, the time required for the discriminating process can be shortened, and the discriminating process becomes more efficient.

The weighting coefficient setting section 90 sets weighting coefficients for the scores sc of the classifiers to be applied such that the score sc (index value) of the classifier corresponding to the at least one predicted facing direction is emphasized, when applying the classifiers to the obtained frame S0'. For example, in the case that the facing direction of the frame immediately preceding the obtained frame S0' is designated as d°, only classifiers corresponding to the facing directions d°, d+15°, and d−15° are applied. If the predicted facing direction is d+15°, the weighting coefficients are such that weighting coefficients wd and wd−15 for d° and d−15° are set to 1.0, and a weighting coefficient wd+15 for d*15° is set to 1.2. When the classifiers corresponding to the facing directions d°, d+15°, and d−15° are applied to the obtained frame S0', the scores scd, scd−15, and scd+15 are multiplied by the weighting coefficients wd, wd−15, and wd+15, respectively. The classifiers perform threshold value judgments employing the weighted scores wd·scd, wd−15·scd−15, and wd+15·scd+15.

By weighting the scores sc of the classifiers that correspond to the predicted facing direction over the scores of other classifiers, the facing direction within the obtained frame S0' can be discriminated by threshold value judgments that take the probability of discrimination for each facing direction into consideration. Therefore, the facing directions within the temporal series image can be discriminated with high reliability.

Next, the flow of processes performed by the facing direction discriminating system 1 will be described.

FIG. 16 is a flow chart that illustrates the processes performed by the facing direction discriminating system 1. As illustrated in FIG. 16, first, the frame image obtaining section 20 obtains a single frame S0 that constitutes temporal series images (step ST31). Then, the image normalizing section 30 administers the aforementioned resolution converting process and the global normalizing process on the obtained frame S0', to obtain a normalized obtained frame S0' (step ST32).

The facing direction predicting section 40 obtains stepwise changes in the facing direction within the immediately preceding 90 frames, based on past discrimination results stored in the memory 60 (step ST33). Next, the facing direction predicting section 40 predicts at least one facing direction within the obtained frame S0' based on the pattern of stepwise change, according to the table illustrated in FIG. 10 (step ST34).

The classifier application order setting section 80 designates the facing direction of the frame immediately preceding the obtained frame S0' as d°, and designates classifiers corresponding to facing directions d° and d±15° as the classifiers to be applied to the obtained frame S0'. Then, the application order of the classifiers is set such that the classifier corresponding to the facing direction predicted in step ST34 is prioritized according to the aforementioned rule (step ST35).

The weighting coefficient setting section 90 sets weighting coefficients wd, wd−15, and wd+15 for the classifiers corresponding to facing directions d°, d−15° and d+15° such that the score sc of the classifier corresponding to the facing direction predicted in step ST34 is emphasized (step ST36). For example, the weighting coefficient for the score sc of the classifier corresponding to the predicted facing direction may be set to be 1.2, while the weighting coefficients for the scores sc of the other classifiers are set to 1.0.

The classifier applying section 40 selects a classifier according to the application order set by the classifier application order setting section 80, and inputs the obtained frame S0' to the selected classifier (step ST37). The score sc calculated by the applied classifier is multiplied by the weighting coefficient set by the weighting coefficient setting section 90 (step ST38). Then, whether the obtained frame S0' includes a face facing the direction corresponding to the applied classifier is judged by a threshold judgment employing the weighted score (step ST39).

In the case that the applied classifier judges that a face facing the predetermined direction corresponding thereto is included in the obtained frame S0', the face within the obtained frame S0' is discriminated to be facing the direction corresponding to the applied classifier (step ST40). The discrimination results are output to the memory 60. On the other hand, in the case that the applied classifier judges that a face facing the predetermined direction corresponding thereto is not included in the obtained frame S0', the process returns to step ST37, the next classifier in the set application order is selected, and the obtained frame S0' is input to the selected classifier.

The above is a discrimination process for discriminating the facing direction within a single obtained frame S0. By repeating the discrimination process for sequentially obtained frames, the facing directions within the obtained frames can be continuously discriminated.

According to the facing direction discriminating system 1 of the present embodiment, the plurality of types of state classifiers, which have been prepared for each facing direction are employed. During discrimination of the facing direction within the temporal series images, the plurality of types of state classifiers are not repeatedly used in the same order. Instead, past discrimination results of images within the temporal series images are employed to obtain stepwise changes of the facing direction. The facing direction within the image, which is the target of the discrimination process, is predicted based on the stepwise changes, and the classifier corresponding to the predicted facing direction is prioritized over the other classifiers when applying the classifiers. Therefore, the facing direction within the image, which is the target of the discrimination process, can be discriminated at an earlier stage. That is, the facing direction within the temporal series image can be efficiently discriminated.

In addition, according to the facing direction discriminating system 1 of the present embodiment, a plurality of types of classifiers, which have been prepared for each facing direction and which judge whether a discrimination target image includes the predetermined target in predetermined states by threshold value judgment of index values, are employed. During discrimination of the facing direction within temporal series images, the plurality of types of classifiers do not employ the calculated index values as they are. Instead, past discrimination results of images within the temporal series images are employed to obtain stepwise changes of the predetermined subject. The facing direction within the image, which is the target of the discrimination process, is predicted based on the stepwise changes, and the index value of the classifier corresponding to the predicted facing direction is weighted. Therefore, the facing direction within the image, which is the target of the discrimination process, can be discriminated by threshold value judgments that take the probability of correct discrimination into consideration. That is, the facing direction with in the temporal series image can be discriminated with high reliability.

Note that in the present embodiment, a case has been described in which facing directions are discriminated within temporal series images which have been video imaged such that human faces are included within the frames thereof at a predetermined size. In the case that facing directions are to be discriminated from within temporal series images which have been obtained by video imaging such that the sizes and positions of human faces vary among the frames thereof, partial images of a predetermined size may be cut out from each of the temporal series images while varying the positions thereof, for example. The discriminating process may be administered on each of the cut out partial images, and detection of faces and discrimination of facing directions may be simultaneously be performed in the temporal series images.

The facing direction discriminating system 1 of the present embodiment comprises both the classifier application order setting section 70 and the weighting coefficient setting section 80. However, a facing direction discriminating system may comprise only one of these two components.

The size of faces which can be discriminated by the facing direction discriminating system 1 of the present invention is substantially fixed. In the case that facing directions of faces of various sizes are to be discriminated, the obtained frames S0 may be subjected to multiple resolution processes, to generate a plurality of images having different resolutions. Then, discriminating processes similar to that described in the present embodiment may be administered onto each of the generated plurality of images.

A facing direction discriminating system according to an embodiment of the present invention has been described above. A program that causes a computer to execute the processes performed by the system is also an embodiment of the present invention. In addition, a computer readable medium having such a program recorded therein is also an embodiment of the present invention.

What is claimed is:

1. A subject state discriminating method, comprising the steps of:
    (i) preparing a plurality of types of state classifiers, for judging whether a judgment target image includes a predetermined subject in predetermined states, each type of state classifier corresponding to each of the predetermined states;
    (ii) obtaining a single image from among a plurality of temporal series images of the predetermined subject;
    (iii) employing at least one of the types of state classifiers to judge whether the obtained image includes the predetermined subject; and
    (iv) discriminating that the predetermined subject within the obtained image is in a state corresponding to that of the state classifier that judged that the predetermined subject is included in the obtained image, when the employed classifier judges that the predetermined subject is included in the obtained image;
    wherein:
    stepwise changes in the state of the predetermined subject are obtained, based on previously discriminated states of the predetermined subject within a plurality of temporal series images preceding the obtained image;
    a state of the predetermined subject is predicted for the obtained image, based on the stepwise changes; and
    the state classifier that corresponds to the predicted state is first employed when carrying out step (iii).

2. A subject state discriminating method, comprising the steps of:
preparing a plurality of types of state classifiers, for judging whether a judgment target image includes a predetermined subject in predetermined states, each type of state classifier corresponding to each of the predetermined states;
obtaining a single image from among a plurality of temporal series images of the predetermined subject;
employing at least one of the types of state classifiers to judge whether the obtained image includes the predetermined subject; and
discriminating that the predetermined subject within the obtained image is in a state corresponding to that of the state classifier that judged that the predetermined subject is included in the obtained image, when the employed classifier judges that the predetermined subject is included in the obtained image;
wherein:
the state classifiers calculate index values that represent probabilities that the judgment target image includes the predetermined subject in the predetermined states, and performs judgments by comparing the index values against threshold values;
stepwise changes in the state of the predetermined subject are obtained, based on previously discriminated states of the predetermined subject within a plurality of temporal series images preceding the obtained image;
a state of the predetermined subject is predicted for the obtained image, based on the stepwise changes; and
the index value to be used for the comparison against the threshold values is weighted, if the index value is the one calculated by the state classifier that corresponds to the predicted state.

3. A subject state discriminating method as defined in claim 1, wherein:
the predetermined subject is a face; and
the predetermined states are directions in which the faces are facing.

4. A subject state discriminating method as defined in claim 2, wherein:
the predetermined subject is a face; and
the predetermined states are directions in which the faces are facing.

5. A subject state discriminating apparatus, comprising:
a plurality of types of state classifiers to judge whether a judgment target image includes a predetermined subject in predetermined states, each type of state classifier corresponding to each of the predetermined states;
image obtaining module to obtain a single image from among a plurality of temporal series images of the predetermined subject;
state classifier applying module to employ at least one of the types of state classifiers to judge whether the obtained image includes the predetermined subject;
state discriminating module to discriminating that the predetermined subject within the obtained image is in a state corresponding to that of the state classifier that judged that the predetermined subject is included in the obtained image, when the state classifier judges that the predetermined subject is included in the obtained image;
memory module to record previous discrimination results for the plurality of temporal series images;
state predicting module to obtain stepwise changes in the state of the predetermined subject, based on previously discriminated states of the predetermined subject within a plurality of temporal series images preceding the obtained image recorded in the memory, and to predict a state of the predetermined subject for the obtained image, based on the stepwise changes; and
state classifier application order setting module to set the order that the state classifiers are applied such that the state classifier that corresponds to the predicted state is employed when the state classifier module is first employed.

6. A subject state discriminating apparatus, comprising:
a plurality of types of state classifiers to judge whether a judgment target image includes a predetermined subject in predetermined states, each type of state classifier corresponding to each of the predetermined states;
image obtaining module to obtain a single image from among a plurality of temporal series images of the predetermined subject;
state classifier applying to apply at least one of the types of state classifiers to judge whether the obtained image includes the predetermined subject, the state classifiers to perform judgments by calculating index values that represent probabilities that the judgment target image includes the predetermined subject in the predetermined states and comparing the index values against threshold values;
state discriminating module to discriminate that the predetermined subject within the obtained image is in a state corresponding to that of the state classifier that judged that the predetermined subject is included in the obtained image, when the employed classifier judges that the predetermined subject is included in the obtained image;
memory to record previous discrimination results for the plurality of temporal series images;
state predicting module to obtain stepwise changes in the state of the predetermined subject, based on previously discriminated states of the predetermined subject within a plurality of temporal series images preceding the obtained image recorded in the memory, and to predict a state is employed when the state classifier module is first employed; and
index weighting module to weigh the index value to be used for comparison against the threshold values, if the index value is the one calculated by the state classifier that correspond to the predicted state.

7. A subject state discriminating apparatus as defined in claim 5, wherein:
the predetermined subject is a face; and
the predetermined states are directions in which the faces are facing.

8. A subject state discriminating apparatus as defined in claim 6, wherein:
the predetermined subject is a face; and
the predetermined states are directions in which the faces are facing.

9. A subject state discriminating non-transitory computer-readable medium for storing a program that causes a computer to function as:
a plurality of types of state classifiers for judging whether a judgment target image includes a predetermined subject in predetermined states, each type of state classifier corresponding to each of the predetermined states;
image obtaining module for obtaining a single image from among a plurality of temporal series images of the predetermined subject;
state classifier applying module for applying at least one of the types of state classifiers to judge whether the obtained image includes the predetermined subject;

state discriminating module for discriminating that the predetermined subject within the obtained image is in a state corresponding to that of the state classifier that judged that the predetermined subject is included in the obtained image when the state classifier judges that the predetermined subject is included in the obtained image;

memory for recording previous discrimination results for the plurality of temporal series images;

state predicting module for obtaining stepwise changes in the state of the predetermined subject, based on previously discriminated states of the predetermined subject within a plurality of temporal series images preceding the obtained image recorded in the memory, and for predicting a state of the predetermined subject for the obtained image, based on the stepwise changes; and state classifier application order setting module for setting the order that the state classifiers are applied such that the state classifier that corresponds to predicted state is employed when the state classifier module is first employed.

10. A subject state discriminating non-transitory computer-readable medium for storing a program that causes a computer to function as:

a plurality of types of state classifiers for judging whether a judgment target image includes a predetermined subject in predetermined states, each type of state classifier corresponding to each of the predetermined states;

image obtaining module for obtaining a single image from among a plurality of temporal series images of the predetermined subject;

state classifier applying module for applying at least one of the types of state classifiers to the obtained image to judge whether the obtained image includes the predetermined subject, the state classifiers performing judgments by calculating index values that represent probabilities that the judgment target image includes the predetermined subject in the predetermined states and comparing the index values against threshold values;

state discriminating module for discriminating that the predetermined subject within the obtained image is in a state corresponding to that of the state classifier that judged that the predetermined subject is included in the obtained image, when the employed classifier judges that the predetermined subject is included in the obtained image;

memory for recording previous discrimination results for the plurality of temporal series images;

state predicting module for obtaining stepwise changes in the state of the predetermined subject, based on previously discriminated states of the predetermined subject within a plurality of temporal series images preceding the obtained image recorded in the memory, and for predicting a state is employed when the state classifier module is first employed; and index weighting module for weighing the index value to be used for comparison against the threshold values, if the index value is the one calculated by the state classifier that correspond to the predicted state.

11. A subject state discriminating non-transitory computer-readable medium for storing a program as defined in claim 9, wherein:

the predetermined subject is a face; and the predetermined states are directions in which the faces are facing.

12. A subject state discriminating non-transitory computer-readable medium for storing a program as defined in claim 10, wherein:

the predetermined subject is a face; and the predetermined states are directions in which the faces are facing.

* * * * *